US011988090B1

(12) United States Patent
Tian et al.

(10) Patent No.: US 11,988,090 B1
(45) Date of Patent: May 21, 2024

(54) METHOD AND SYSTEM FOR EXTRACTING FEATURES OF LOGGING WHILE DRILLING AND DRILLING-TIME LOGGING BASED ON UNET DUAL-CHANNEL OUTPUT

(71) Applicant: Institute of Geology and Geophysics, Chinese Academy of Sciences, Beijing (CN)

(72) Inventors: Fei Tian, Beijing (CN); Jiangyun Zhang, Beijing (CN); Wenhao Zheng, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/328,911

(22) Filed: Jun. 5, 2023

(30) Foreign Application Priority Data

Dec. 23, 2022 (CN) .......................... 202211667645.1

(51) Int. Cl.
*E21B 49/00* (2006.01)
*G01V 20/00* (2024.01)

(52) U.S. Cl.
CPC .............. *E21B 49/00* (2013.01); *G01V 20/00* (2024.01); *E21B 2200/22* (2020.05)

(58) Field of Classification Search
None
See application file for complete search history.

(56) References Cited

U.S. PATENT DOCUMENTS

2020/0301036 A1* 9/2020 Ramfjord .................. E21B 7/04
2022/0044124 A1* 2/2022 Wang ..................... G06N 3/084

FOREIGN PATENT DOCUMENTS

| CN | 107272059 A | 10/2017 |
| CN | 113780698 A | 12/2021 |
| CN | 115685327 A | 2/2023 |

OTHER PUBLICATIONS

Guo, Liang, et al. "Logging Data Completion Based on an MC-GAN-BiLSTM Model." IEEE Access 10 (2021): 1810-1822. (Year: 2021).*

* cited by examiner

*Primary Examiner* — Raymond L Nimox
(74) *Attorney, Agent, or Firm* — Nitin Kaushik

(57) ABSTRACT

The present description relates to the field of geological exploration, and discloses a method and system for extracting features of logging while drilling and drilling-time logging based on Unet dual-channel output, aiming at solving the problem that the prior art 5 cannot integrate various types of information for lithology classification. The present invention comprises: acquiring stratum data of different wells; eliminating outliers, normalizing and resampling; performing data reconstruction via a self-encoder-based artificial neural network based on the pre-trained data to obtain stratum reconstructed data for training; inputting the data to be analyzed from shallow to deep in segments, performing 10 dynamic optimization while drilling on the pre-trained self-encoder-based artificial neural network by a quantile loss function; and extracting the independent components output by the encoder dual-channel for unsupervised clustering, and fitting to obtain a stratum lithology determination result corresponding to the current data to be analyzed.

2 Claims, 5 Drawing Sheets

METHOD AND SYSTEM FOR EXTRACTING FEATURES OF LOGGING WHILE DRILLING AND DRILLING-TIME LOGGING BASED ON UNET DUAL-CHANNEL OUTPUT

CROSS-REFERENCE TO RELATED APPLICATIONS

The application claims priority to Chinese patent application No. 202211667645.1, filed on Dec. 23, 2022, the entire contents of which are incorporated herein by reference.

TECHNICAL FIELD

The application relates to the field of geological exploration, in particular to a method and system for extracting features of logging while drilling and drilling-time logging based on Unet dual-channel output.

BACKGROUND

Oil and gas exploration develops in an unconventional, deep to ultra-deep way, and therefore is faced with more and more complicated problems. In a long geological history, deep complex oil and gas reservoirs are subjected to multiple tectonics superimposition, and there are various ways of aggregating oil and gas reservoirs, which greatly weakens connectivity. Therefore, the conventional vertical well type has been unable to meet production requirements. Based on the real-time measured geological, geophysical, and drilling parameters, the horizontal well geosteering system optimizes the three-dimensional well trajectory to the designated location of the oil and gas reservoir to obtain the maximum drainage area and the best recovery, which becomes the front technology to improve the single well oil and gas production and oilfield development benefits. The real-time automatic identification of lithology while drilling is one of the key problems of this technology. In an aspect of well trajectory design, logging while drilling and drilling-time logging and well drilling engineering parameters represent all aspects of the characteristics of the stratum beside the well. However, the methods of stratum identification at present can only make a separate analysis and determination through logging while drilling and drilling-time logging and well drilling engineering parameters alone, and insufficiency of information for analysis leads to inaccuracy of lithology identification.

An object of this patent is to establish a set of machine learning algorithms, using logging while drilling and drilling-time logging, drilling engineering parameters to achieve integration of various sounding depth segments, and automatic discrimination of lithology corresponding to comprehensive data.

SUMMARY

The present description provides a method for extracting features of logging while drilling and drilling-time logging to solve the problem in the prior art that the methods can only make a separate analysis and determination through logging while drilling and drilling-time logging and well drilling engineering parameters alone, and insufficiency of information for analysis leads to inaccuracy of lithology identification, and the method of the present invention comprises:

step S100, acquiring stratum data of different wells, eliminating outliers, normalizing and resampling to obtain data to be analyzed; wherein the stratum data and the data to be analyzed are 21 curve data of different wells;

acquiring pre-trained data;

step S200, performing data reconstruction via a self-encoder-based artificial neural network based on the pre-trained data to obtain stratum reconstructed data;

wherein the self-encoder-based artificial neural network, which is constructed based on an Unet structure, comprises an encoder part and a decoder part; the encoder part comprises four convolution layer-pooling layer groups; the number of convolution kernels of the convolution layer successively decreases, the size of the pooling layer is the same as the corresponding convolution layer, and the output end of the encoder is a dual-channel output; the decoder part comprises four deconvolution layers-an up-sampled layer group, wherein the deconvolution layer and the convolution layer in a symmetrical position have the same size but different calculation process, and the size of the up-sampled layer is the same as that of the corresponding deconvolution layer;

step S300, pre-training the self-encoder-based artificial neural network with the stratum reconstructed data to obtain a pre-trained self-encoder-based artificial neural network; and step S400, inputting the data to be analyzed from shallow to deep in segments into the pre-trained self-encoder-based artificial neural network to obtain dynamically optimized reconstructed data, and establishing a quantile loss function by comparing the dynamically optimized reconstructed data of the previous segment with the data to be analyzed of the current segment, and then performing dynamic optimization while drilling on the pre-trained self-encoder-based artificial neural network to obtain a dynamically optimized self-encoder-based artificial neural network; extracting the independent components output by the encoder dual-channel in the dynamically optimized self-encoder-based artificial neural network for unsupervised clustering, obtaining independent component sample point groups, and fitting to obtain a stratum lithology determination result corresponding to the current data to be analyzed.

In some preferred embodiments, eliminating outliers, normalizing, and resampling comprise:

eliminating outliers, analyzing a distribution histogram of each stratum data, fitting a Gaussian distribution, and obtaining outliers-eliminated data from data points out of $(u-3\sigma, u+3\sigma)$;

normalizing, on the basis of the eliminated outlier data, normalizing the same eliminated outlier data of different wells end-to-end to obtain normalized data;

$$c_z^s = \frac{(g_z^s - \text{Average}(g^s))}{v^s}$$

wherein $g_z^s$ represents a data value of the $z^{th}$ sampling point of the $s^{th}$ curve, and Average represents a calculated average value; $g^s$ represents all data sample points of the s curve; $v^s$ represents a variance of the s curve; $c_z^s$ represents a data value of the $z^{th}$ sampling point of the s curve after normalization; and resampling, using spline interpolation to discrete values of different normalized data of different wells, resampling being N/W data points, W being the number of wells.

In some preferred embodiments, the self-encoder-based artificial neural network is specifically:

the number of channels in the input layer is 21, corresponding to 21 types of curve data, the size of the input layer is 1×N×21, and N is the number of elements;

the convolution layer uses a ReLU function as an activation function output after completing a convolution operation;

4 convolution layers are taken as a first convolution layer, a second convolution layer, a third convolution layer and a fourth convolution layer, and corresponding pooling layers are taken as a first encoder pooling layer, a second encoder pooling layer, a third encoder pooling layer and a fourth encoder pooling layer;

the first convolution layer is a one-dimensional convolution layer with a convolution kernel length of N/(W×K$_1$), K$_1$ is a pre-set value, the number of convolution kernels is 84, the step length is 1, padding=same, and the output size obtained after the first convolution layer is 1×N×84;

the first pooling layer is the maximum pooling layer, the pooling area is 1×2, the step size is 2, the output size is 1×(N/2)×84, and the output channels include 84 channels;

the second convolution layer is a one-dimensional convolution layer with a convolution kernel length of N/(W×K$_2$), K$_2$ is a pre-set value; the number of convolution kernels is 28; the step length is 1; padding=same; the output size obtained after the second convolution layer is 1×(N/2)×28; and after convolution, a ReLU function is used as an activation function to output;

the second pooling layer is the maximum pooling layer, the pooling area is 1 ×2, the step size is 2, the output size is 1×(N/4)×28, and the output channels include 28 channels;

the third convolution layer is a one-dimensional convolution layer with a convolution kernel length of N/(W×K$_3$), K$_3$ is a pre-set value, the number of convolution kernels is 7, the step length is 1, padding=same, and the output size obtained after the third convolution layer is 1×(N/4)×7;

the third pooling layer is the maximum pooling layer, the pooling area is 1×2, the step size is 2, the output size is 1×(N/8)×7, and the output channels include 7 channels;

the fourth convolution layer is a one-dimensional convolution layer with a convolution kernel length of N/(W×K$_4$), K$_4$ is a pre-set value, the number of convolution kernels is 2, the step length is 1, padding=same, and the output size obtained after the fourth convolution layer is 1×(N/8)×2;

the fourth pooling layer is the maximum pooling layer, the pooling area is 1 ×2, the step size is 2, the output size is 1×(N/16)×2, and the output channels include 2 channels;

values of K$_1$, K$_2$, K$_3$ and K$_4$ are set, so that a receptive field of each data point in the dual-channel output of Unet model covers the data point of 1-5 m;

the decoder part comprises four deconvolution layers-up-sampled layers, the deconvolution layer has a different calculation process from the convolution layer in a symmetrical position, the size of the up-sampled layer is the same as that of the corresponding deconvolution layer and is calculated using linear interpolation.

In some preferred embodiments, the self-encoder-based artificial neural network has a convolution layer calculated by:

$$S(i)=(I*K)(i)=\Sigma_n I(i-n)K(n)$$

S(i) represents an output value at the position of i, K(n) represents the $n^{th}$ element of the convolution kernel, represents the multiplication and addition of the $i^{th}$ element of the input vector I with the n elements of the convolution kernel.

In some preferred embodiments, the up-sampled layer is calculated by:

$$x_c^i(n) = x_c^j(2n)$$

$$(x_c^i(n) + x_c^i(n+1))/2 = x_c^j(2n+1)$$

after performing a deconvolution operation on a L$_c$ deconvolution layer, mapping via a ReLU activation function to serve as input data of an up-sampled layer of the L$_c$ layer, and taking an up-sampled output of the L$_c$ layer as input data of a deconvolution layer on the L$_{c+1}$ layer;

taking x$_c^i$ as the input data of an up-sampling layer of the L$_c$ layer, taking x$_c^j$ as an output data of an up-sampling layer of the L$_c$ layer, a vector scale of x$_c^j$ is twice the x$_c^i$ scale, and c represents a layer sequence number.

In some preferred embodiments, the step S300 is specifically:

step S310, calculating a root mean square loss function based on the stratum reconstructed data:

$$\text{Loss fun} = \sqrt{\sum_{i=1}^{N}\left(x_{true}^j - x_{prediction}^j\right)^2}$$

wherein X$_{true}^i$ represents the $i^{th}$ data sample of a model input curve, and x$_{prediction}^i$ represents the $i_{th}$ data sample of a model output curve;

step S320, adjusting model parameters by a random batch gradient descent algorithm until the root mean square loss function is lower than a pre-set threshold value, or reaches a pre-set number of iterations, and obtaining a pre-trained self-encoder-based artificial neural network;

In some preferred embodiments, step S400 comprises:

step S410, guiding a drill according to a pre-set drilling trajectory, and setting an initial momentum gradient to $V_{\nabla w_0}=0$;

step S420, setting the acquired stratum data as one mini-batch data set when drilling by a preset distance;

step S430, inputting the mini-batch data set into the self-encoder-based artificial neural network to obtain dynamically optimized reconstructed data;

step S440, calculating a Quantile Loss function and a gradient vector$\nabla W_1$ of a weight parameter thereof on the basis of the dynamically optimized reconstructed data;

$$L_\alpha(y, y^p) = \sum_{i=y_i<y_i^p}(\alpha-1)*|y_i - y_i^p| + \sum_{i=y_i\geq y_i^p}(\alpha)*|y_i - y_i^p|$$

in the formula: y represents the data to be analyzed while drilling, y$^P$ represents the reconstructed data corresponding to the first mini-batch data set, and α represents a given quantile, and a value thereof is between 0 and 1;

α can be set automatically, during drilling, to normalize the historical data together with the currently entered Mini-batch data and to calculate the average value of the currently entered Minnibatch data as a value of α.

$$\alpha = \left(\sum_{Minibatch} \frac{(m_n - h_{min})}{h_{max} - h_{min}}\right)/b$$

in the formula, m$_n$ represents a value of the $n^{th}$ sample point in the current minibatch data set, h$_{min}$ represents the minimum value of historical sample points; and $h_{max}$ represents the maximum value of historical sample points;

step S450, based on the gradient vector $\nabla W_k$, performing momentum gradient update, and replacing the old momentum gradient with a new momentum gradient;

$$V_{\nabla w_k} = \beta V_{\nabla w_{k-1}} + (1-\beta)\nabla W_k$$

k represents the serial number of mini-batch data set, and β represents the gradient influence coefficient;

step S460, extracting a dual-channel output of the fourth pooling layer as an independent component;

step S470, based on the independent components, performing clustering via a HAC method, and then fitting via the distribution of a Gaussian mixture model on an axis of the independent components, and using 3σ as a boundary to define a category threshold to obtain independent component sample point groups;

step S480, obtaining a lithology classification of the current mini-batch data set sample points according to the distribution of core sample points in the independent component sample point groups;

step S490, repeating the method of steps S430-S480 until all the mini-batch data sets are traversed from shallow to deep to obtain a lithology determination result.

In some preferred embodiments, the Quantile Loss function may be replaced by a root mean square loss function, the remaining steps remain to be unchanged, and step S400 is performed.

In another aspect of the present invention, a system for extracting features of logging while drilling and drilling-time logging based on Unet dual-channel output is disclosed, the system comprising:

a data preparation module configured for acquiring stratum data of different wells, and eliminating outliers, normalizing and resampling to obtain data to be analyzed; wherein the stratum data and the data to be analyzed are 21 curve data of different wells;

acquiring pre-trained data;

a reconstructed data acquisition module configured for performing data reconstruction via a self-encoder-based artificial neural network based on the pre-trained data to obtain stratum reconstructed data;

wherein the self-encoder-based artificial neural network, which is constructed based on an Unet structure, comprises an encoder part and a decoder part; the encoder part comprises four convolution layer-pooling layer groups; the number of convolution kernels of the convolution layer successively decreases, the size of the pooling layer is the same as the corresponding convolution layer, and the output end of the encoder is a dual-channel output; the decoder part comprises four deconvolution layers-an up-sampled layer group, wherein the deconvolution layer and the convolution layer in a symmetrical position have the same size but different calculation process, and the size of the up-sampled layer is the same as that of the corresponding deconvolution layer;

a pre-training module configured for pre-training the self-encoder-based artificial neural network with the stratum reconstructed data to obtain a pre-trained self-encoder-based artificial neural network;

a dynamic optimization while drilling module configured for inputting the data to be analyzed from shallow to deep in segments into the pre-trained self-encoder-based artificial neural network to obtain dynamically optimized reconstructed data, and establishing a quantile loss function by comparing the dynamically optimized reconstructed data of the previous segment with the data to be analyzed of the current segment, and then performing dynamic optimization while drilling on the pre-trained self-encoder-based artificial neural network to obtain a dynamically optimized self-encoder-based artificial neural network; extracting the independent components output by the encoder dual-channel in the dynamically optimized self-encoder-based artificial neural network for unsupervised clustering, obtaining independent component sample point groups, and fitting to obtain a stratum lithology determination result corresponding to the current data to be analyzed.

The above-mentioned at least one technical solution adopted by the embodiments of the present description can achieve the following advantageous effects:

(1) the present invention achieves automatic lithology discrimination by automatically integrating a large number of differentiated parameters in logging while drilling and drilling-time logging, and well drilling engineering;

(2) the present invention further comprises a self-encoder neural network, wherein an output of the decoder is used for adjusting the model weight, and the output of the encoder is used for dimension reduction output of logging while drilling and drilling-time logging and well drilling engineering parameters, and an independent component is obtained for lithology determination, so that different data with multiple dimensions and great differences can be well reduced, and since the processed information is more comprehensive, the accuracy of lithology determination is improved;

(3) the present invention can realize intelligent drill guiding and at the same time, automatically distinguish lithology beside a well, provide a stratum identification background for selecting a well trajectory, guide the design of a three-dimensional well trajectory, and provide a reference for a multi-dimensional well curve dimension reduction algorithm;

(4) the present invention can adapt to lithology identification at different depths and improve robustness and accuracy by implementing real-time model correction using an optimization algorithm of gradient descent with momentum while drilling after pre-training;

(5) in order to be applicable as much as possible to intelligent stratum identification while drilling, the present invention employs a set of unsupervised learning algorithms using unlabeled data as a data set, avoiding the over-constraint of artificially defined labels on complex and variable formations while drilling.

BRIEF DESCRIPTION OF DRAWINGS

The accompanying drawings, which are included to provide a further understanding of the invention and are incorporated in and constitute a part of this application, illustrate embodiments of the invention and together with the description explain the invention and do not constitute an undue limitation of the invention. In the drawings.

DETAILED DESCRIPTION OF THE EMBODIMENTS

To make the objects, technical solutions, and advantages of the present application clearer, the technical solutions of the present application will be clearly and completely described below with reference to the embodiments of the present application and the accompanying drawings. It should be apparent that the described embodiments are only a few embodiments of the present application, and not all embodiments. Based on the embodiments in the present application, all other embodiments obtained by a person skilled in the art without involving any inventive effort are within the scope of protection of the present application.

Reference will now be made in detail to the embodiments of the present application, examples of which are illustrated in the accompanying drawings.

Figure 1:
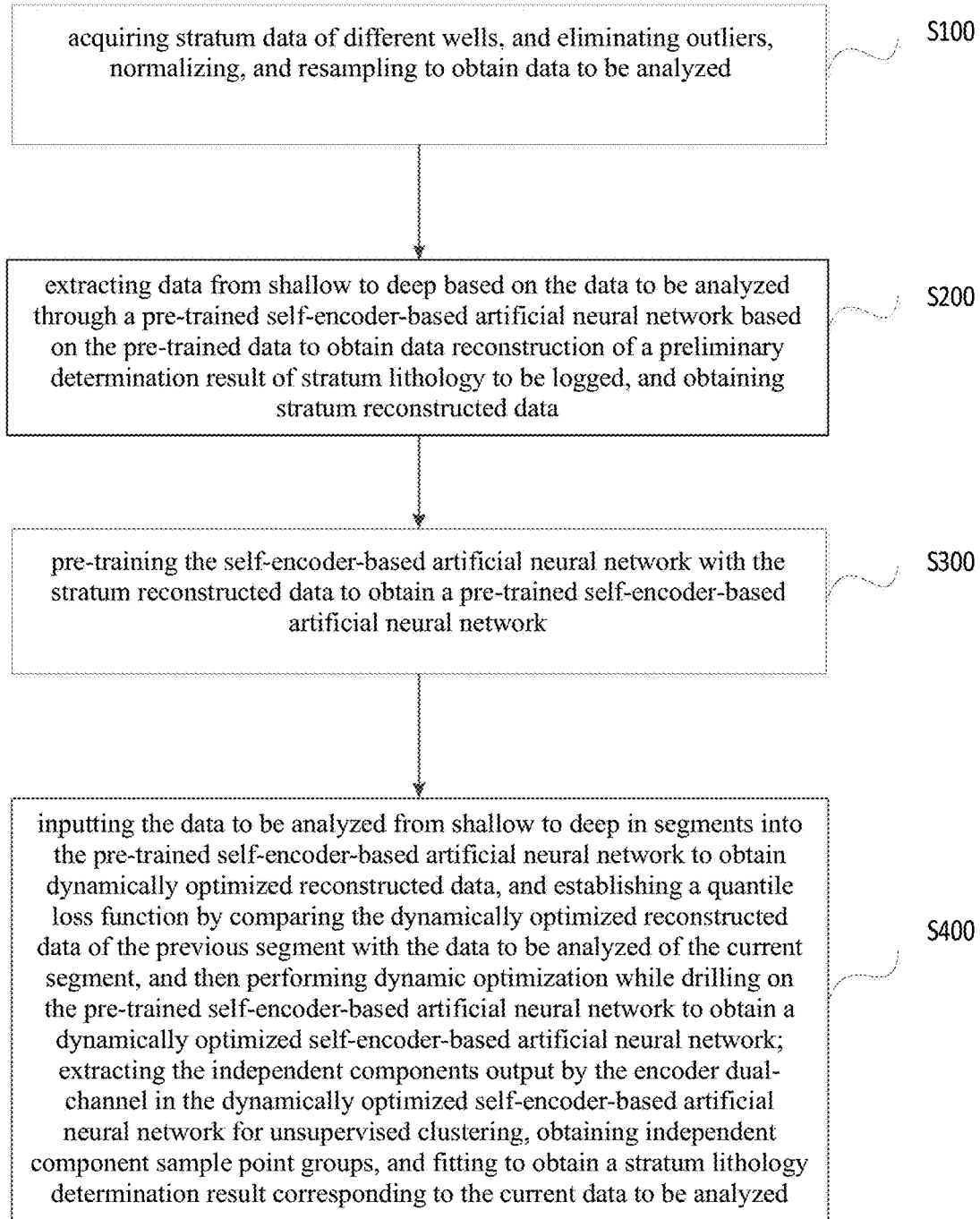
FIG. 1 is a schematic flow chart of method and system for extracting features of logging while drilling and drilling-time logging based on Unet dual-channel output according to an embodiment of the present invention.
Figure 2:
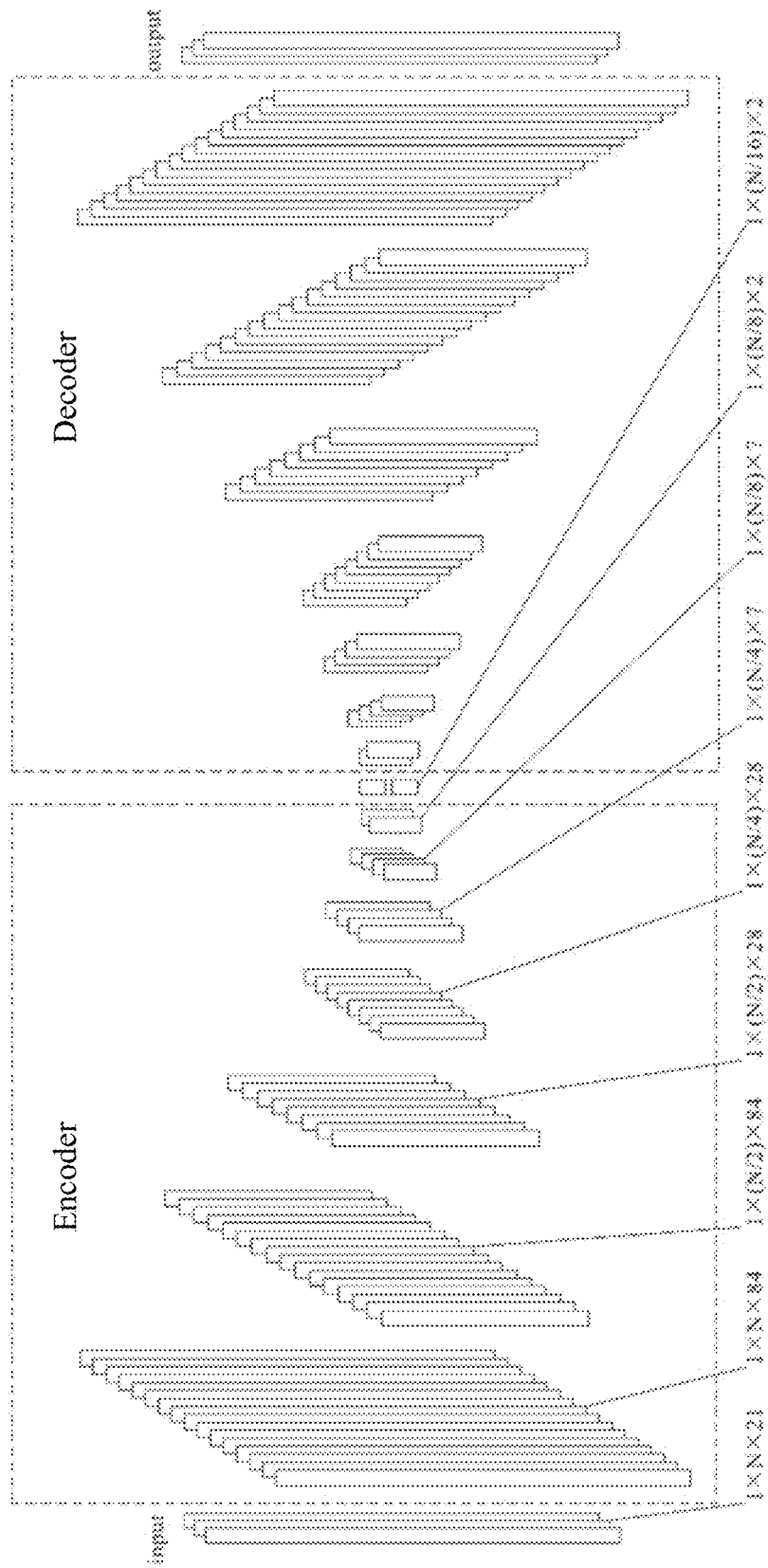
FIG. 2 is a schematic view showing a network structure of a pre-trained self-encoder-based artificial neural network according to an embodiment of the present invention.

FIG. 1 is a method for extracting features of logging while drilling and drilling-time logging based on a Unet dual-channel output provided by an embodiment of the present description, and with reference to FIG. 1, the method may specifically comprise the following steps:

step S100, acquiring stratum data of different wells, and eliminating outliers, normalizing and resampling to obtain data to be analyzed; wherein the stratum data and the data to be analyzed are 21 curve data of different wells;

In this embodiment, the eliminating outliers, normalizing, and resampling comprise:

eliminating outliers, analyzing a distribution histogram of each stratum data, fitting a Gaussian distribution, and obtaining outliers-eliminated data from data points out of (u−3σ, u+3σ);

normalizing, on the basis of the eliminated outlier data, normalizing the same eliminated outlier data of different wells end-to-end to obtain normalized data; in this embodiment, M curves are set for three types of data including logging while drilling, well drilling engineering and drilling-time logging information, and the same curve data of each well is integrated for normalizing and processing to obtain the normalized data;

$$c_Z^s = \frac{(g_Z^s - \text{Average}(g^s))}{v^s}$$

wherein $g_z^s$ represents a data value of the $z^{th}$ sampling point of the $s^{th}$ curve, and Average represents a calculated average value; $g^s$ represents all data sample points of the $s^{th}$ curve; $v^s$ represents a variance of the s curve; $c_z^s$ represents a data value of the $z^{th}$ sampling point of the $s^{th}$ curve after normalization;

resampling, using spline interpolation to discrete values of different normalized data of different wells, resampling being N/W data points, W being the number of wells. The sampling point interval is set to be 0.01 m in this embodiment.

acquiring pre-trained data;

step S200, performing data reconstruction via a self-encoder-based artificial neural network based on the pre-trained data to obtain stratum reconstructed data;

the self-encoder-based artificial neural network, as shown in FIG. 2, is constructed based on a Unet structure, comprises an encoder part and a decoder part; the encoder part comprises four convolution layer-pooling layer groups; the number of convolution kernels of the convolution layer successively decreases, the size of the pooling layer is the same as the corresponding convolution layer, and the output end of the encoder is a dual-channel output; the decoder part comprises four deconvolution layers-an up-sampled layer group, wherein the deconvolution layer and the convolution layer in a symmetrical position have the same size but different calculation process, and the size of the up-sampled layer is the same as that of the corresponding deconvolution layer.

In this embodiment, the self-encoder-based artificial neural network is specifically:

the number of channels in the input layer is 21, corresponding to 21 types of curve data, the size of the input layer is 1×N×21, and N is the number of elements; in this embodiment, if M=21 and W=30 are set, there are a total of M=21 types of curve data for each well, each curve is provided by data of W=30 wells, the same curve data of each well is connected end-to-end, and is arranged as a one-dimensional vector with the number of elements being N according to the depth corresponding to the value from small to large.

the convolution layer uses a ReLU function as an activation function output after completing a convolution operation;

4 convolution layers are taken as a first convolution layer, a second convolution layer, a third convolution layer and a fourth convolution layer, and corresponding pooling layers are taken as a first encoder pooling layer, a second encoder pooling layer, a third encoder pooling layer and a fourth encoder pooling layer;

the first convolution layer is a one-dimensional convolution layer with a convolution kernel length of N/(W×$K_1$), $K_1$ is a pre-set value, the number of convolution kernels is 84, the step length is 1, padding=same, and the output size obtained after the first convolution layer is 1×N×84;

the first pooling layer is the maximum pooling layer, the pooling area is 1×2, the step size is 2, the output size is 1×(N/2)×84, and the output channels include 84 channels;

the second convolution layer is a one-dimensional convolution layer with a convolution kernel length of N/(W×$K_2$), $K_2$ is a pre-set value; the number of convolution kernels is 28; the step length is 1; padding=same; the output size obtained after the second convolution layer is 1×(N/2)×28; and after convolution, a ReLU function is used as an activation function to output;

the second pooling layer is the maximum pooling layer, the pooling area is 1 ×2, the step size is 2, the output size is 1×(N/4)×28, and the output channels include 28 channels;

the third convolution layer is a one-dimensional convolution layer with a convolution kernel length of N/(W×$K_3$), $K_3$ is a pre-set value, the number of convolution kernels is 7, the step length is 1, padding=same, and the output size obtained after the third convolution layer is 1×(N/4)×7;

the third pooling layer is the maximum pooling layer, the pooling area is 1×2, the step size is 2, the output size is 1×(N/8)×7, and the output channels include 7 channels;

the fourth convolution layer is a one-dimensional convolution layer with a convolution kernel length of N/(W×$K_4$), $K_4$ is a pre-set value, the number of convolution kernels is 2, the step length is 1, padding=same, and the output size obtained after the fourth convolution layer is 1×(N/8)×2;

the fourth pooling layer is the maximum pooling layer, the pooling area is 1 ×2, the step size is 2, the output size is 1×(N/16)×2, and the output channels include 2 channels;

values of $K_1$, $K_2$, $K_3$ and $K_4$ are set, so that a receptive field of each data point in the dual-channel output of Unet model covers the data point of 1-5 m;

In this embodiment, the self-encoder-based artificial neural network has a convolution layer calculated by:

$$S(i)=(I*K)(i)=\Sigma_n I(i-n)K(n)$$

S(i) represents an output value at the position of i, K(n) represents the $n^{th}$ element of the convolution kernel, $\Sigma$ represents the multiplication and addition of the $i^{th}$ element of the input vector I with the n elements of the convolution kernel.

the decoder part comprises four deconvolution layers-upsampled layers, the deconvolution layer has a different calculation process from the convolution layer in a symmetrical position, the size of the up-sampled layer is the same as that of the corresponding deconvolution layer and is calculated using linear interpolation.

In this embodiment, the up-sampled layer is calculated by:

$$x_c^i(n) = x_c^j(2n)$$

$$(x_c^i(n) + x_c^i(n+1))/2 = x_c^j(2n+1)$$

after performing a deconvolution operation on a $L_c$ deconvolution layer, mapping via a ReLU activation function to serve as input data of an up-sampled layer of the $L_c$ layer, and taking an up-sampled output of the $L_c$ layer as input data of a deconvolution layer on the $L_{c+1}$ layer;

taking $x_c^i$ as the input data of an up-sampled layer of the $L_c$ layer, taking $x_c^j$ as an output data of an up-sampled layer of the $L_c$ layer, a vector scale of $x_c^j$ is twice the $x_c^i$ scale, and c represents a layer sequence number.

step S300, pre-training the self-encoder-based artificial neural network with the stratum reconstructed data to obtain a pre-trained self-encoder-based artificial neural network;

In this embodiment, step S300 is specifically:

step S310, calculating a root mean square loss function based on the stratum reconstructed data:

$$\text{Loss fun} = \sqrt{\sum_{i=1}^{N}\left(x_{true}^i - x_{prediction}^i\right)^2}$$

wherein $x_{true}^i$ represents the $i^{th}$ data sample of a model input curve, and $x_{prediction}^i$ represents the $i^{th}$ data sample of a model output curve;

step S320, adjusting model parameters by a random batch gradient descent algorithm until the root mean square loss function is lower than a pre-set threshold value, or reaches a pre-set number of iterations, and obtaining a pre-trained self-encoder-based artificial neural network;

step S400, inputting the data to be analyzed from shallow to deep in segments into the pre-trained self-encoder-based artificial neural network to obtain dynamically optimized reconstructed data, and establishing a quantile loss function by comparing the dynamically optimized reconstructed data of the previous segment with the data to be analyzed of the current segment, and then performing dynamic optimization while drilling on the pre-trained self-encoder-based artificial neural network to obtain a dynamically optimized self-encoder-based artificial neural network; extracting the independent components output by the encoder dual-channel in the dynamically optimized self-encoder-based artificial neural network for unsupervised clustering, obtaining independent component sample point groups, and fitting to obtain a stratum lithology determination result corresponding to the current data to be analyzed.

The present invention uses an algorithm of gradient descent with momentum to iteratively calculate a loss function to obtain the optimal model parameters. In the process of the intelligent drill guide, the descending gradient of the loss function will be updated according to the input data as new data is input continuously. To achieve the effect of dynamic optimization. The current output-independent components are used as input data for the unsupervised clustering algorithm. After clustering, the lithology labels of various data points are calibrated after the description of lithic fragments from drilling-time logging and the comparative analysis of casting sheet information.

Figure 3:
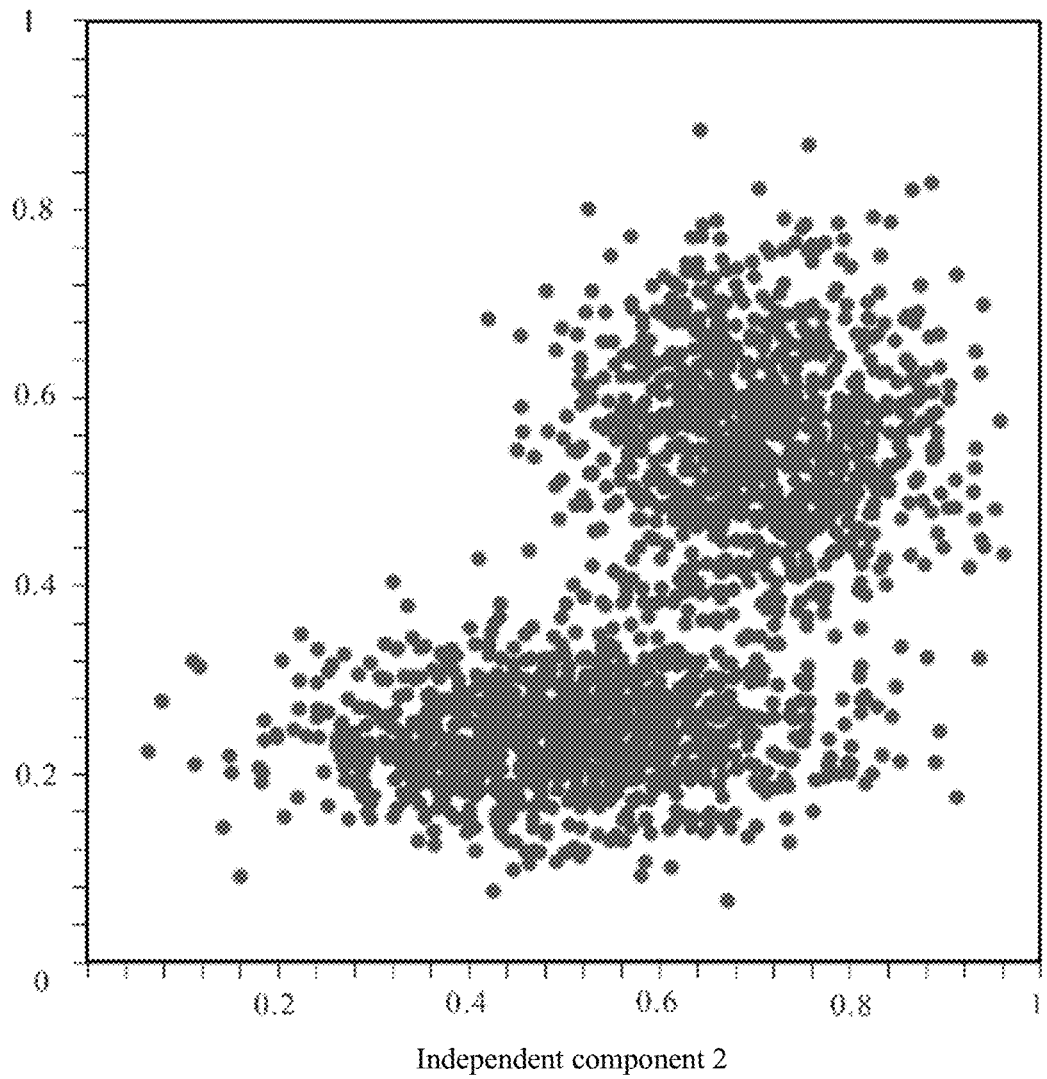
FIG. 3 is a schematic diagram of the distribution of independent component sample points of the dual channel output of an encoder according to an embodiment of the present invention.
Figure 4:
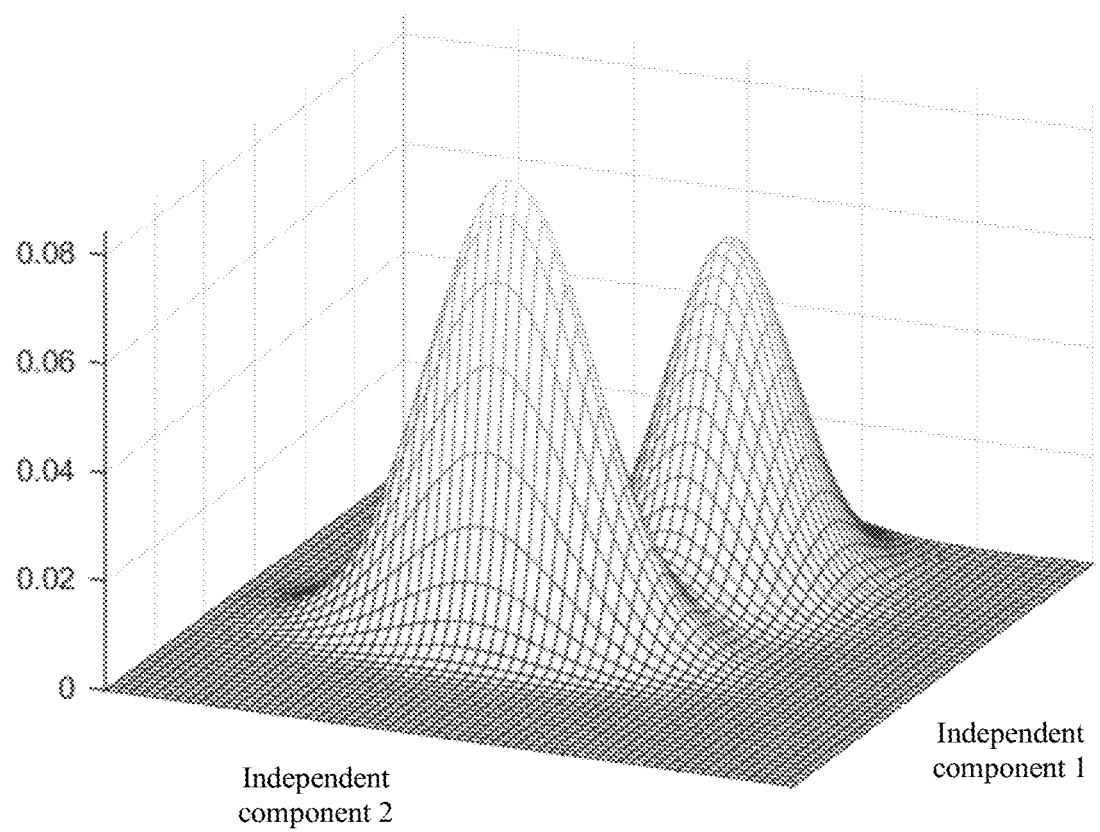
FIG. 4 is a schematic diagram of the independent component Gaussian distribution of the dual channel output of the encoder according to an embodiment of the present invention.
Figure 5:
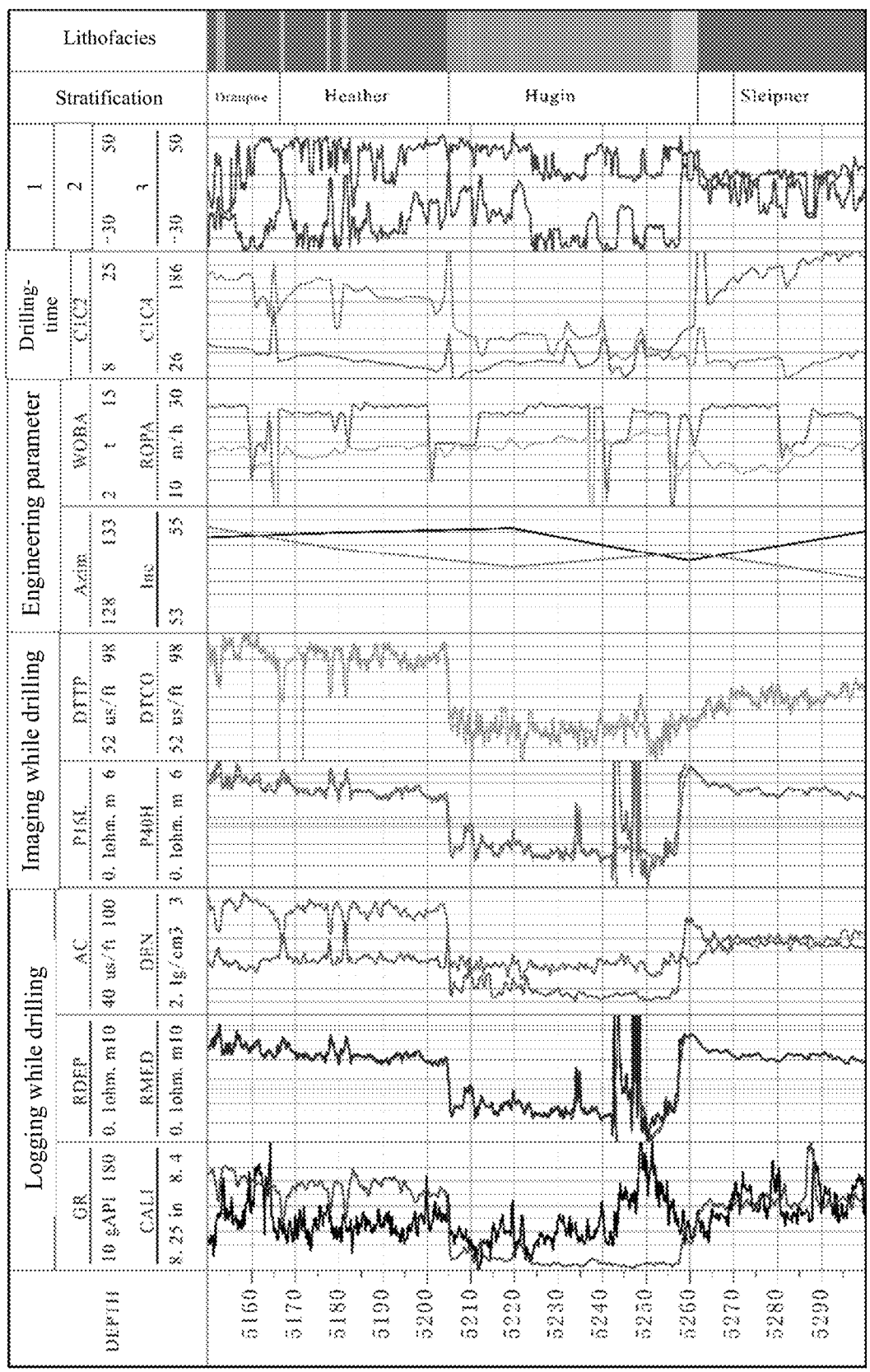
FIG. 5 is a schematic diagram of lithology determinations accordingto an embodiment of the present invention.

In this embodiment, step S400 specifically comprises:

step S410, guiding a drill according to a pre-set drilling trajectory, and setting an initial momentum gradient to $V_{\nabla w_0}=0$;

step S420, setting the acquired stratum data as one minibatch data set when drilling by a preset distance;

step S430, inputting the mini-batch data set into the self-encoder-based artificial neural network to obtain dynamically optimized reconstructed data;

step S440, calculating a Quantile Loss function and a gradient vector $\nabla W_1$ of a weight parameter thereof on the basis of the dynamically optimized reconstructed data;

$$L_\alpha(y, y^p) = \sum_{i=y_i<y_i^p}(\alpha-1)*|y_i - y_i^p| + \sum_{i=y_i\geq y_i^p}(\alpha)*|y_i - y_i^p|$$

in the formula: y represents the data to be analyzed while drilling, $y^p$ represents the reconstructed data corresponding to the first mini-batch data set, and $\alpha$ represents a given quantile, and a value thereof is between 0 and 1;

$\alpha$ can be set automatically, during drilling, to normalize the historical data together with the currently entered Minibatch data and to calculate the average value of the currently entered Minnibatch data as a value of $\alpha$.

$$\alpha = \left(\sum\nolimits_{Minibatch}\frac{(m_n - h_{min})}{h_{max} - h_{min}}\right)/b$$

in the formula, $m_n$ represents a value of the $n^{th}$ sample point in the current minibatch data set, $h_{min}$ represents the minimum value of historical sample points; and $h_{max}$ represents the maximum value of historical sample points;

step S450, based on the gradient vector $\nabla W_k$, performing momentum gradient update, and replacing the old momentum gradient with a new momentum gradient;

$$V_{\nabla w_k}=\beta V_{\nabla w_{k-1}}+(1-\beta)\nabla W_k$$

k represents the serial number of mini-batch data set, and $\beta$ represents the gradient influence coefficient;

step S460, extracting a dual-channel output of the fourth pooling layer as an independent component;

step S470, based on the independent components, performing clustering via a HAC method, and then fitting via the distribution of a Gaussian mixture model on an axis of the independent components, and using 3$\sigma$ as a boundary to define a category threshold to obtain independent component sample point groups; the distribution of clustered sample points in this example is as shown in FIG. 3, and the effect of Gaussian distribution through independent components is as shown in FIG. 4.

step S480, obtaining a lithology classification of the current mini-batch data set sample points according to the distribution of core sample points in the independent component sample point groups;

step S490, repeating the method of steps S430-S480 until all the mini-batch data sets are traversed from shallow to deep to obtain a lithology determination result; The lithology determination result output by the present invention is compared with a conventional method as shown in FIG. 5; it is shown from the data level that our data set includes logging while drilling, imaging while drilling, engineering parameters, drilling-time logging information multi-dimensional parameters for lithology identification achieves more accurate results than traditional analysis using only a single data type. Two independent components are also obtained from the feature level through the self-encoder model as a result of dimension reduction of the high- dimensional parameters.

In the pre-training stage, the root-mean-square loss function can make the pre-trained model have strong robustness to different logging while drilling, drilling- time logging, and engineering parameter data of different well location strata, which can meet the requirements of continuous optimization on that basis. In the dynamic optimization stage, the quantile loss function can be used to adjust the model in real- time by the momentum gradient optimization algorithm in the drilling stage, so that the data converges faster and the dual-channel data can be acquired faster, which meets the real-time requirements of knowing the logging while drilling.

The advantage of the root-mean-square loss function is that, due to the introduction of a large number of well data in the pre-training, the stratum lithology, physical properties and electrical properties are very different, and the root-mean- square loss function has strong robustness, so that the model can better fit the data of different geological backgrounds.

In order to adjust the output data of the model in real-time to reconstruct the input data as much as possible due to the complex changes of the stratum background in drilling a well, the penalty of the overestimated or underestimated data in the optimization process can be set by using the quantile loss function to improve the accuracy.

The foregoing is illustrative of the present invention and should not be construed as limiting. Various modifications and alterations to this application will become apparent to a person skilled in the art. It is intended that the following appended claims be interpreted as including all such alterations, permutations, and improvements as fall within the true spirit and scope of the present application.

What is claimed is:

1. A method for extracting features of logging while drilling and drilling-time logging based on Unet dual-channel output, wherein the method comprises:

step S100, acquiring stratum data of different wells, eliminating, outliers, normalizing and resampling to obtain data to be analyzed: wherein the stratum data and the data to he analyzed are 21 curve data of different wells;

wherein the eliminating outliers, normalizing and resampling specifically comprise:

eliminating outliers, analyzing a distribution histogrmn of each straLum data, fitting a Gaussian distribution, and obtaining outliers-eliminated data from, data points out of $(u-3\sigma, u+3\sigma)$;

normalizing, based on the eliminated outlier data, normalizing the same eliminated outlier data of different wells end-to-end to obtain normalized data;

$$c_z^s = \frac{(g_z^s - \text{Average}(g^s))}{v^3}$$

wherein $g_z^s$ represents a data value of the $z^{th}$ sampling point of the $s^{th}$ curve, and Average represents a calculated average value: $g^s$ represents all data sample points of the $s^{th}$ curve; $v^s$ represents a variance of the $s^{th}$ curve; $c_z^s$ represents a data value of the $z^{th}$ sampling point of the $s^{th}$ curve after normalization; and resampling discrete values of different normalized data of different wells into N/W data points using spline interpolation, W being the number of wells:

acquiring pre-trained data;

step S200, performing data reconstruction via a self-encoder-based artificial neural network based on the pre-trained data to obtain stratum reconstructed data;

wherein the self-encoder-based artificial neural network is constructed based on a Unet structure, and comprises an encoder part and a decoder part; the encoder part comprises four convolution layer-pooling layer groups; the number of convolution kernels of the convolution layer successively decreases, the size of the pooling layer is the same as the corresponding convolution layer, and the output end of the encoder is a dual-channel output; the decoder part comprises four deconvolution layers-an up-sampled layer group, wherein the deconvolution layer and the convolution layer in a symmetrical position have the same size but different calculation process, and the size. of the up-sampled layer is the same as that of the corresponding deconvolution layer;

the self-encoder-based artificial neural network is specifically:

the number of channels in the input layer is 21, corresponding to 21 types of curve data, the size of the input layer is 1×N×21, and N is the number of elements:

the convolution layer uses a ReLU function as an activation function output after completing a convolution operation;

4 convolution layers are taken as a first convolution layer, a second convolution layer, a third convolution layer and a fourth convolution layer, and corresponding pooling layers are taken as a first encoder pooling layer, a second encoder pooling layer, a third encoder pooling layer and a fourth encoder pooling layer;

the first convolution layer is a one-dimensional convolution layer with a convolution kernel length of $N/(W \times K_1)$, $K_1$ is a pre-set value, the number of convolution kernels is 84, the step length is 1, padding=same, and the output size obtained after the first convolution layer is 1×N×84;

the first pooling layer is the maximum pooling layer, the pooling area is 1×2, the step size is 2, the output size is 1×(N/2)×84, and the output channels include 84 channels;

the second convolution layer is a one-dimensional convolution layer with a convolution kernel length of N/(W×K$_2$), K$_2$ is a pre-set value; the number of convolution kernels is 28; the step length is 1; padding=same; the output size obtained after the second convolution layer is 1×(N/2) ×28; and after convolution, a ReLU function is used as an activation function to output;

the second pooling layer is the maximum pooling layer, the pooling area is 1×2, the step size is 2, the output size is 1×(N/4)×28, and the output channels include 28 channels;

the third convolution layer is a one-dimensional convolution layer with a convolution kernel length of N/(W× K$_3$), K$_3$ is a pre-set value, the number of convolution kernels is 7, the step length is 1, padding=same, and the output size obtained after the third convolution layer is 1×(N/4)×7;

the third pooling layer is the maximum pooling layer, the pooling area is 1×2, the step size is 2, the output size is 1×(N/8)×7, and the output channels include 7 channels;

the fourth convolution layer is a one-dimensional convolution layer with a convolution kernel length of N/(W× K$_4$), K$_4$ is a pre-set value, the number of convolution kernels is 2, the step length is 1, padding=same, and the output size obtained after the fourth convolution layer is 1×(N/8)×2;

the fourth pooling layer is the maximum pooling layer, the pooling area is 1×2, the step size is 2, the output size is 1×(N/16)×2, and the output channels include 2 channels;

values of K$_1$, K$_2$, K$_3$ and K$_4$ are set, so that a receptive field of each data point in the dual-channel output of Unet model covers the data point of 1 to 5 m;

the decoder part comprises four deconvolution layers-upsampled layers, the deconvolution layer has a different calculation process from the convolution layer in a symmetrical position, the size of the up-sampled layer is the same as that of the corresponding deconvolution layer and is calculated using linear interpolation;

the self-encoder-based artificial neural network has a convolution layer calculated by:

$$S(i) = (I * K)(i) = \sum_n I(i-n)K(n)$$

wherein S(i) represents an output value at the position of i, K(n) represents the n$^{th}$ element of the convolution kernel, Σ represents the multiplication and addition of the i$^{th}$ element of the input vector I with the n elements of the convolution kernel; the up-sampled layer is calculated by:

$$x_c^i(n) = x_c^j(2n)$$
$$(x_c^i(n) + x_c^i(n+1))/2 = x_c^j(2n+1)$$

after performing a deconvolution operation on a L$_c$ deconvolution layer, mapping via a ReLU activation function to serve as input data of an up-sampled layer of the L$_c$ layer, and taking an up-sampled output of the L$_c$ layer as input data of a deconvolution layer on the L$_{c+1}$ layer;

taking x$_c^i$ as the input data of an up-sampled layer of the L$_c$ layer, taking x$_c^j$ as an output data of an up-sampled layer of the L$_c$ layer, a vector scale of x$_c^j$ is twice the x$_c^i$ scale, and c represents a layer sequence number;

step S300: pre-training the self-encoder-based artificial neural network with the stratum reconstructed data to obtain a pre-trained self-encoder-based artificial neural network;

the step S300 specifically comprises:

step S310: calculating a root mean square loss function based on, the stratum reconstructed data:

$$\text{Loss fun} = \sqrt{\sum_{i=1}^{N} (x_{true}^i - x_{prediction}^i)^2}$$

wherein x$_{true}^i$ represents the i$^{th}$ data sample of a model input curve, and x$_{prediction}^i$ represents the i$^{th}$ data sample of a model output curve;

step S320: adjusting model parameters by a random batch gradient descent algorithm until the root mean square loss function is lower than a pre-set threshold value, or reaches a pre-set number of iterations, and obtaining a pre-trained self-encoder-based artificial neural network;

step S400: inputting the data to be analyzed from shallow to deep in segments into the pre-trained self-encoder-based artificial neural network to obtain dynamically optimized reconstructed data, and establishing a quantile loss function by comparing the dynamically optimized reconstructed data of the previous segment with the data to be analyzed of the current segment, and then performing dynamic optimization while drilling on the pre-trained self-encoder-based artificial neural network to obtain a dynamically optimized self-encoder-based artificial neural network; extracting the independent components output by the encoder dual-channel in the dynamically optimized self-encoder-based artificial neural network for unsupervised clustering, obtaining independent component sample point groups, and fitting to obtain a stratum lithology determination result corresponding to the current data to be analyzed;

the step s400 specifically comprises:

step S410: guiding a drill according to a pre-set drilling trajectory, and setting an initial momentum gradient to V$_{\nabla W_0}$=0;

step S420: setting the acquired stratum data as one mini-batch data set when drilling by a preset distance;

step S430: inputting the mini-hatch data set into the self-encoder-based artificial neural network to obtain dynamically optimized reconstructed data;

step S440: calculating a Qraantile Loss quantile loss function and a gradient vector ∇W$_1$ of a weight parameter thereof on the basis of the dynamically optimized reconstructed data;

$$L_\alpha(y, y^p) = \sum_{i=y_i < y_i^p} (\alpha - 1) * |y_i - y_i^p| + \sum_{i=y_i \geq y_i^p} (\alpha) * |y_i - y_i^p|$$

in the formula: y represents the data to be analyzed while drilling, y$^p$ represents the reconstructed data corresponding to the first mini-batch data set, and α represents a given quantile, and a value thereof is between 0 and 1;

during drilling, to normalize the historical data together with the currently entered Minibatch data and to calculate the average value of the currently entered Minnibatch data as a value of α:

$$\alpha = \left( \sum_{Minibatch} \frac{(m_n - h_{min})}{h_{max} - h_{min}} \right) / b$$

in the formula, $m_n$ represents a value of the $n^{th}$ sample point in the current minibatch data set, $h_{min}$ represents the minimum value of historical sample points; and $h_{max}$ represents the maximum value of historical sample points;

step S450: based on the gradient vector $\nabla W_k$ of the $k^{th}$ dataset, performing gradient vector update, and replacing the old gradient vector with a new gradient vector;

$$V_{\nabla w_k} = \beta V_{\nabla w_{k-1}} + (1-\beta) \nabla W_k$$

k represents the serial number of mini-batch data set, and β represents the gradient influence coefficient:

step S460: extracting a dual-channel output of the fourth pooling layer as an independent component:

step S470: based on the independent components. performing clustering via a HAC method, and then fitting via the distribution of a Gaussian mixture model on an axis of the independent components, and using 3σ as a boundary to define a category threshold to obtain independent component sample point groups;

step S480: obtaining a lithology classification of the current mini-batch data set sample points according to the distribution of core sample points in the independent component sample point groups; and step S490: repeating the method of steps S430-S480 until all the mini-batch data sets are traversed from shallow to deep to obtain a lithology determination result.

2. A system for extracting features of logging while drilling and drilling-time logging based on Unet dual-channel output system, wherein the system comprises:

a data preparation module configured for acquiring stratum data of different wells, and eliminating outliers, normalizing and resampling to obtain data to be analyzed; wherein the stratum data and the data to be analyzed are 21 curve data of different wells;

wherein the eliminating outliers, normalizing and resampling specifically comprise:

eliminating outliers, analyzing a distribution histogram of each stratum data, fitting a Gaussian distribution, and obtaining outliers-eliminated data from data points out of (u−3σ, u+3σ);

normalizing, based on the eliminated outlier data, normalizing the same eliminated outlier data of different wells end-to-end to obtain normalized data;

$$c_z^s = \frac{(g_z^s - \text{Average}(g^s))}{v^s}$$

wherein $g_z^s$ represents a data value of the $z^{th}$ sampling point of the $s^{th}$ curve, and Average represents a calculated average value; $g^s$ represents all data sample points of the $s^{th}$ curve; $v^s$ represents a variance of the $s^{th}$ curve; $c_z^s$ represents a data value of the $z^{th}$ sampling point of the $s^{th}$ curve after normalization; and resampling, using spline interpolation to discrete values of different normalized data of different wells, resampling being N/W data points, W being the number of wells:

acquiring pre-trained data:

a reconstructed data acquisition module configured for performing data reconstruction via a self-encoder-based artificial neural network based on the pre-trained data to obtain stratum reconstructed data:

wherein the self-encoder-based artificial neural network, which is constructed based on a LTnet structure, comprises an encoder part and a decoder part; the encoder part comprises four convolution layer-pooling layer groups; the number of convolution kernels of the convolution layer successively decreases, the size of the pooling layer is the same as the corresponding convolution layer, and the output end of the encoder is a dual-channel output; the decoder part comprises four deconvolution layers-an up-sampled layer group, wherein the deconvolution layer and the convolution layer in a symmetrical position have the same size but different calculation process, and the size of the up-sampled layer is the same as that of the corresponding deconvolution layer;

the self-encoder-based artificial neural network is specifically:

the number of channels in the input layer is 21, corresponding to 21 types of curve data. the size of the input layer is 1×N×21, and N is the number of elements:

the convolution layer uses a ReLU function as an activation function output after completing a convolution operation;

4 convolution layers are taken, as a first convolution layer, a second convolution, layer, a third convolution layer and a fourth convolution layer, and corresponding pooling layers are taken as a first encoder pooling layer, a second encoder pooling layer, a third encoder pooling layer and a fourth encoder pooling layer;

the first convolution layer is a one-dimensional convolution layer with a convolution kernel length of N/(W×$K_1$), $K_1$ is a pre-set value, the number of convolution kernels is 84, the step length is 1, padding=same, and the output size obtained after the first convolution layer is 1N×84;

the first pooling layer is the maximum pooling layer, the pooling area is 1×2, the step size is 2, the output size is 1×(N/2)×84, and the output channels include 84 channels;

the second convolution layer is a one-dimensional convolution layer with a convolution kernel length of N/(W×$K_2$), $K_2$ is a pre-set value; the number of convolution kernels is 28; the step length is 1; padding=same; the output size obtained after the second convolution layer is 1×(N/2) ×28; and after convolution, a ReLU function is used as an activation function to output;

the second pooling layer is the maximum pooling layer, the pooling area is 1×2, the step size is 2, the output size is 1×(N/4)×28, and the output channels include 28 channels;

the third convolution layer is a one-dimensional convolution layer with a convolution kernel length of N/(W×$K_3$), $K_3$ is a pre-set value, the number of convolution kernels is 7, the step length is 1, padding=same, and the output size obtained after the third convolution layer is 1×(N/4)×7;

the third pooling layer is the maximum pooling layer, the pooling area is 1×2, the step size is 2, the output size is 1×(N/8)×7, and the output channels include 7 channels;

the fourth convolution layer is a one-dimensional convolution layer with a convolution kernel length of N/(W×$K_4$), $K_4$ is a pre-set value. the number of convolution kernels is 2, the step length is 1, padding=same, and the output size obtained after the fourth convolution layer is 1×(N/8)×2;

the fourth pooling layer is the maximum pooling layer, the pooling area is 1×2, the step size is 2, the output size is 1×(N/16)×2, and the output channels include 2 channels;

values of $K_1$, $K_2$, $K_3$ and $K_4$ are set, so that a receptive field of each data point in the dual channel output of Unet model covers the data point of 1 to 5 m;

the decoder part comprises four deconvolution layers-upsampled layers. the deconvolution layer has a different calculation process from the convolution layer in a symmetrical position, the size of the up-sampled layer is the same as that of the corresponding deconvolution layer and is calculated using linear interpolation;

the self-encoder-based artificial neural network has a convolution layer calculated by;

$$S(i) = (I*K)(i) = \sum_n I(i-n)K(n)$$

wherein S(i) represents an output value at'the position of i, K (n) represents the $n^{th}$ element of the convolution kernel, $\Sigma$ represents the multiplication and addition of the $i^{th}$ element of the input vector I with the n elements of the convolution kernel; the up-sampled layer is calculated by:

$$x_c^i(n) = x_c^j(2n)$$
$$(x_c^i(n) + x_c^i(n+1))/2 = x_c^j(2n+1)$$

after performing a deconvolution operation on a $L_c$ deconvolution layer, mapping via a ReLU activation function to serve as input data of an up-sampled layer of the $L_c$ layer, and taking an up-sampled output of the $L_c$ layer as input data of a deconvolution layer on the $L_{c+1}$ layer;

taking $x_c^i$ as the input data of an up-sampled layer of the $L_c$ layer, taking $x_c^i$ as an output data of an up-sampled layer of the $L_c$ layer, a vector scale of $x_c^j$ is twice the $x_c^i$ scale, and c represents a layer sequence number;

a pre-training module configured for pre-training the self-encoder-based artificial neural network with the stratum reconstructed data to obtain a pre-trained self-encoder-based artificial neural network;

specifically:

calculating a root mean square loss function based on the stratum reconstructed data:

$$\text{Loss fun} = \sqrt{\sum_{i=1}^{N}(x_{true}^i - x_{prediction}^i)^2}$$

wherein $x_{true}^i$ represents the $i^{th}$ data sample of a model input curve, and $x_{prediction}^i$ represents the $i^{th}$ data sample of a model output curve; and adjusting model parameters by a random batch gradient descent algorithm until the root mean square loss function is lower than a pre-set threshold value, or reaches a pre-set number of iterations, and obtaining a pre-trained self-encoder-based artificial neural network;

a dynamic optimization while drilling module configured for inputting the data to be analyzed from shallow to deep in segments into the pre-trained self-encoder-based artificial neural network to obtain dynamically optimized reconstructed data, and establishing a quantile loss function by comparing the dynamically optimized reconstructed data of the previous segment with the data to be analyzed of the current segment, and then performing dynamic optimization while drilling on the pre-trained self-encoder-based artificial neural network to obtain a dynamically optimized self-encoder-based artificial neural network: extracting the independent components output by the encoder dual-channel in the dynamically optimized self-encoder-based artificial neural network for unsupervised clustering, obtaining independent component sample point groups, and fitting to obtain a stratum Ethology determination result corresponding to the current data to be analyzed;

specifically comprising:

guiding a drill according to a pre-set drilling trajectory. and setting an initial momentum gradient to $V_{\nabla w_0}=0$;

setting the acquired stratum data as one mini-batch data set when drilling by a preset distance;

inputting the mini-batch data set into the self-encoder-based artificial neural network to obtain dynamical optimized reconstructed data; and calculating a Quantile Loss quantile loss function and a gradient vector $\nabla W_1$ of a weight parameter thereof on the basis of the dynamically optimized reconstructed data;

$$L_\alpha(y, y^p) = \sum_{i=y_i<y_i^p}(\alpha-1)*|y_i - y_i^p| + \sum_{i=y_i \geq y_i^p}(\alpha)*|y_i - y_i^p|$$

in the formula, $m_n$ represents a value of the $n^{th}$ sample point in the current minibatch data set, $h_{min}$ represents the minimum value of historical sample points; and $h_{max}$ represents the maximum value of historical sample points;

based on the gradient vector $\nabla W_k$ of the $k^{th}$ dataset. performing gradient vector update, and replacing the old gradient vector with a new gradient vector;

$$V_{\nabla w_k} = \beta V_{\nabla w_{k-1}} + (1-\beta)\nabla W_k$$

k represents the serial number of mini-batch data set, and $\beta$ represents the gradient influence coefficient;

extracting a dual-channel output of the fourth pooling layer as an independent component;

based on the independent components, performing clustering via a HAC method, and then fitting via the distribution of a Gaussian mixture model on an axis of the independent components, and using 3σ as a boundary to define a category threshold to obtain independent component sample point groups;

obtaining a lithology classification of the current mini-batch data set sample points according to the distribution of core sample points in the independent component sample point groups; and repeating obtaining the lithology classification until all the mini-batch data sets are traversed from shallow to deep to obtain a lithology determination result.

* * * * *